US012726769B2

(12) United States Patent
Xu et al.

(10) Patent No.: US 12,726,769 B2
(45) Date of Patent: Sep. 1, 2026

(54) LOUDSPEAKER AND ELECTRONIC DEVICE

(71) Applicant: HUAWEI TECHNOLOGIES CO., LTD., Shenzhen (CN)

(72) Inventors: Changrong Xu, Dongguan (CN); Li Guo, Shanghai (CN); Tienan Zhang, Dongguan (CN); Shijia Pi, Dongguan (CN); Wei Liu, Shenzhen (CN); Chao Xu, Shanghai (CN)

(73) Assignee: Huawei Technologies Co., LTD.

( * ) Notice: Subject to any disclaimer, the term of this patent is extended or adjusted under 35 U.S.C. 154(b) by 497 days.

(21) Appl. No.: 18/256,093

(22) PCT Filed: Nov. 30, 2021

(86) PCT No.: PCT/CN2021/134612
§ 371 (c)(1),
(2) Date: Jun. 6, 2023

(87) PCT Pub. No.: WO2022/121740
PCT Pub. Date: Jun. 16, 2022

(65) Prior Publication Data

US 2024/0040318 A1 Feb. 1, 2024

(30) Foreign Application Priority Data

Dec. 7, 2020 (CN) ......................... 202011420149.7

(51) Int. Cl.
*H04R 9/02* (2006.01)
*H04R 9/06* (2006.01)

(52) U.S. Cl.
CPC ............... *H04R 9/025* (2013.01); *H04R 9/06* (2013.01)

(58) Field of Classification Search
CPC . H04R 9/025; H04R 9/06; H04R 1/06; H04R 7/127; H04R 7/14; H04R 7/20;
(Continued)

(56) References Cited

U.S. PATENT DOCUMENTS 6,269,168 B1 7/2001 Tagami
6,658,121 B1 12/2003 König
(Continued)

FOREIGN PATENT DOCUMENTS

AU 2018253907 A1 11/2019
CN 1886005 A 12/2006
(Continued)

OTHER PUBLICATIONS

Extended European Search Report in European Appln No. 21902447.8, dated Mar. 13, 2024, 10 pages.
(Continued)

*Primary Examiner* — Angelica M Mckinney
(74) *Attorney, Agent, or Firm* — Fish & Richardson P.C.

(57) ABSTRACT

This application relates to a loudspeaker and an electronic device. In one example, the loudspeaker includes a cone frame, a first sounding unit, a second sounding unit, and an elastic suspension. The first sounding unit includes a magnetic circuit structure mounted on the cone frame, an annular vibrating diaphragm, and a voice coil connected to the annular vibrating diaphragm. The second sounding unit is arranged coaxially with the first sounding unit, where the second sounding unit is mounted in the middle of a side that is of the magnetic circuit structure and that faces the annular vibrating diaphragm. The elastic suspension is configured to elastically support the voice coil and the annular vibrating diaphragm on the cone frame.

20 Claims, 5 Drawing Sheets

(58) Field of Classification Search
CPC ...... H04R 9/043; H04R 9/045; H04R 31/003; H04R 31/006; H04R 2400/11; H04R 2499/11; H04R 1/24; H04R 9/02
See application file for complete search history.

(56) References Cited

U.S. PATENT DOCUMENTS

| | | | |
|---|---|---|---|
| 9,674,603 | B1 | 6/2017 | Yeh et al. |
| 2002/0094097 | A1 | 7/2002 | Sagren |
| 2019/0313195 | A1 | 10/2019 | Kim et al. |
| 2020/0221214 | A1 | 7/2020 | Mordechai |

FOREIGN PATENT DOCUMENTS

| | | | | | |
|---|---|---|---|---|---|
| CN | 201957233 | U | * | 8/2011 | ............... H04R 9/02 |
| CN | 204334907 | U | * | 5/2015 | ............... H04R 1/10 |
| CN | 106341760 | A | | 1/2017 | |
| CN | 107135448 | A | | 9/2017 | |
| CN | 207382573 | U | | 5/2018 | |
| CN | 108513235 | A | * | 9/2018 | ............. H04R 9/045 |
| CN | 105848065 | B | * | 2/2019 | ............... H04R 9/06 |
| CN | 208509255 | U | * | 2/2019 | ............... H04R 9/06 |
| CN | 209861159 | U | * | 12/2019 | ............... H04R 9/06 |
| CN | 110784803 | A | | 2/2020 | |
| CN | 215991191 | U | | 3/2022 | |
| KR | 102032166 | B1 | | 10/2019 | |

OTHER PUBLICATIONS

International Search Report and Written Opinion in International Appln. No. PCT/CN2021/134612, mailed on Feb. 9, 2022, 17 pages (with English translation).

* cited by examiner

LOUDSPEAKER AND ELECTRONIC DEVICE

CROSS-REFERENCE TO RELATED APPLICATIONS

This application is a national stage of International Application No. PCT/CN2021/134612, filed on Nov. 30, 2021, which claims priority to Chinese Patent Application No. 202011420149.7, filed on Dec. 7, 2020. Both of the aforementioned applications are hereby incorporated by reference in their entireties.

TECHNICAL FIELD

Embodiments of this application relate to the field of loudspeaker structures, and in particular, to a loudspeaker and an electronic device.

BACKGROUND

Sound effects are basic requirements of loudspeakers (for example, headsets and speaker boxes). Users have increasingly high requirements for sound effects of loudspeakers, requiring the loudspeakers to have wider high-frequency extension and better low-frequency dive. A conventional loudspeaker uses a single speaker unit, making it difficult to meet an optimal design of both treble and bass. A bass effect indicates no treble part, and a treble effect indicates no bass part. Output sound quality is poor. Based on this, a loudspeaker combining a treble unit and a bass unit has emerged in the industry. FIG. 1, FIG. 2 and FIG. 3 show three types of loudspeakers that each use a dual-unit combination. The three loudspeakers each use a moving coil speaker as a bass unit 10, and respectively use a moving coil speaker, a piezoelectric ceramic sounding piece, and a moving iron speaker as treble units 20. The two units in each loudspeaker are stacked axially, taking up much axial space, and an overall structural thickness is about 1.5 to 2.5 times a thickness of a single moving coil unit. The existing loudspeaker that combines the treble unit and the bass unit has a large axial size, making it difficult to meet a requirement for tight inner space of the loudspeaker. There is also a problem of sound separation caused by a phase difference between sounds of different frequencies emitted by the treble unit and the bass unit.

SUMMARY

Embodiments of this application provide a loudspeaker and an electronic device, to resolve the problem of a large axial size of the existing loudspeaker that combines a treble unit and a bass unit, and the problem of sound separation caused by a phase difference between sounds of different frequencies emitted by the treble unit and the bass unit.

To achieve the foregoing objective, the following technical solutions are used in embodiments of this application.

According to a first aspect, an embodiment of this application provides a loudspeaker, including a cone frame, a first sounding unit, a second sounding unit, and an elastic suspension. The first sounding unit includes a magnetic circuit structure, a voice coil, and an annular vibrating diaphragm. The magnetic circuit structure is mounted on the cone frame, and the magnetic circuit structure includes an annular air gap. The annular vibrating diaphragm is separated from the magnetic circuit structure. The voice coil is connected to the annular vibrating diaphragm. At least a part of the voice coil is accommodated in the annular air gap. A bass vibration sound source surface is formed at a joint between the voice coil and the annular vibrating diaphragm. The voice coil is configured to generate, when an audio current passes through the voice coil in a first magnetic field provided by the magnetic circuit structure, a second magnetic field that changes with the audio current. The second sounding unit and the first sounding unit are arranged coaxially. The second sounding unit is mounted in the middle of a side that is of the magnetic circuit structure and that faces the annular vibrating diaphragm. A sound frequency of the second sounding unit is greater than a sounding frequency of the first sounding unit. The second sounding unit includes a treble vibration sound source surface. The treble vibration sound source surface and the bass vibration sound source surface are coplanar. The elastic suspension is configured to elastically support the voice coil and the annular vibrating diaphragm on the cone frame.

In the loudspeaker according to embodiments of this application, a moving coil speaker is used as the first sounding unit, and the second sounding unit is arranged in the middle of a side of a magnetic circuit structure of the first sounding unit. Because the first sounding unit and the second sounding unit can respectively output sounds of different frequencies, the loudspeaker can meet requirements for both treble and bass, and improve high-frequency extension and low-frequency dive performance. Compared with a conventional loudspeaker in which a treble unit and a bass unit are stacked axially, the second sounding unit in the loudspeaker according to embodiments of this application is located in the middle of a side of the magnetic circuit structure, so that the loudspeaker has a small axial size, and has an overall thickness close to a thickness of a single moving coil unit, to improve space utilization. The second sounding unit and the first sounding unit are coaxially arranged. The treble vibration sound source surface of the second sounding unit and the bass vibration sound source surface of the first sounding unit are coplanar. This can reduce sound separation caused by a phase difference between sounds of different frequencies that are output by different units, and contribute to a more accurate sense of a spatial position of a musical instrument. The voice coil and the annular vibrating diaphragm are elastically supported on the cone frame through the elastic suspension. This facilitates vibration of the voice coil and the annular vibrating diaphragm in a predetermined range, to reduce swinging polarization, and improve reliability.

With reference to the first aspect, in a first possible implementation of the first aspect, the elastic suspension includes an inner ring portion, a middle ring portion, and an outer ring portion that are coaxially arranged, a first cantilever connected between the inner ring portion and the middle ring portion, and a second cantilever connected between the middle ring portion and the outer ring portion, where the inner ring portion is arranged close to the second sounding unit, the voice coil is connected to the middle ring portion, and the outer ring portion is connected to the cone frame. When the voice coil vibrates up and down in the annular air gap, the middle ring portion and a joint between the annular vibrating diaphragm and the middle ring portion follow the vibration. The first cantilever and the second cantilever respectively pull on an inner side and an outer side of the middle ring portion, guiding the voice coil and the annular vibrating diaphragm to vibrate in the predetermined range, to effectively reduce swinging polarization or even breaking of the voice coil, and improve the reliability of the first sounding unit.

With reference to the first possible implementation of the first aspect, in a second possible implementation of the first aspect, the elastic suspension is configured as a flexible circuit board for providing an audio current for the voice coil and the second sounding unit. The outer ring portion includes an input terminal, the voice coil and the middle ring portion are electrically connected, and the second sounding unit and the inner ring portion are electrically connected. During assembly, the voice coil and the second sounding unit are respectively arranged in the middle ring portion and the inner ring portion. Ends of the voice coil are connected to positive and negative terminals of the middle ring portion. The second sounding unit is connected to positive and negative terminals of the inner ring portion. The input terminal of the outer ring portion is connected to an external circuit. In this way, the line is connected to implement signal transmission without manually leading the voice coil and the second sounding unit, to reduce process difficulty, improve assembly efficiency and reliability, and facilitate the automation process.

With reference to the first possible implementation or the second possible implementation of the first aspect, in a third possible implementation of the first aspect, both the first cantilever and the second cantilever are arranged in a winding manner. An anti-fatigue capability of the cantilevers is improved. The cantilevers of the elastic suspension are configured relatively long in the limited space to meet a requirement for tight space.

With reference to any one of the first possible implementation to the third possible implementation of the first aspect, in a fourth possible implementation of the first aspect, there are a plurality of first cantilevers, and the plurality of first cantilevers are symmetrically arranged with an axis of the middle ring portion as a center. There are a plurality of second cantilevers, and the plurality of second cantilevers are symmetrically arranged with the axis of the middle ring portion as the center. The first cantilevers are bent in a same manner, and the second cantilevers are bent in a same manner. The cantilevers are arranged in the centrosymmetric manner, so that radial vibration on two sides of the voice coil is symmetrical, to effectively reduce and suppress swing, and improve sound quality.

With reference to any one of the first possible implementation to the fourth possible implementation of the first aspect, in a fifth possible implementation of the first aspect, a ratio of a diameter difference between the outer ring portion and the middle ring portion to a diameter difference between the middle ring portion and the inner ring portion ranges from 0.6 to 1.4. In this way, the voice coil is roughly arranged at a middle position between an inner edge and an outer edge of the annular vibrating diaphragm, to increase a sounding area of the first sounding unit, and improve a sounding effect of the first sounding unit.

With reference to any one of the first aspect to the fifth possible implementation of the first aspect, in a sixth possible implementation of the first aspect, the magnetic circuit structure includes a magnetic conductive base, a magnet, and a magnetic conductive plate. The magnetic conductive base includes a plate-shaped portion and a cylindrical portion connected to an outer edge of the plate-shaped portion. The magnet is mounted on the plate-shaped portion. The magnetic conductive plate is mounted on the magnet. Both an outer peripheral surface of the magnet and an outer peripheral surface of the magnetic conductive plate are separated from an inner wall of the cylindrical portion and form the annular air gap. An end that is of the annular air gap and that is close to the magnetic conductive plate forms an opening for the voice coil to extend into. The cylindrical portion is mounted on the cone frame. The magnetic circuit structure can generate a magnetic line passing through the annular air gap, referred to as a first magnetic field. The voice coil extends at least partly through the opening of the annular air gap to generate a second magnetic field when an audio current passes through the voice coil. The second magnetic field of the voice coil interacts with the first magnetic field of the magnetic circuit structure, so that the voice coil vibrates to drive the annular vibrating diaphragm to vibrate.

With reference to any one of the first aspect to the fifth possible implementation of the first aspect, in a seventh possible implementation of the first aspect, the magnetic circuit structure includes a magnetic conductive base, an annular magnet, and a magnetic conductive ring. The magnetic conductive base includes a plate-shaped portion and a columnar portion connected to the middle of the plate-shaped portion. The annular magnet is mounted on the plate-shaped portion. The magnetic conductive ring is mounted on the annular magnet. Both an inner peripheral surface of the annular magnet and an inner peripheral surface of the magnetic conductive ring are separated from an outer peripheral surface of the columnar portion and form the annular air gap. An end that is of the annular air gap and that is close to the magnetic conductive ring forms an opening for the voice coil to extend into. The magnetic conductive base is mounted on the cone frame. The magnetic circuit structure can generate a magnetic line passing through the annular air gap, referred to as a first magnetic field. The voice coil extends at least partly through the opening of the annular air gap to generate a second magnetic field when an audio current passes through the voice coil. The second magnetic field of the voice coil interacts with the first magnetic field of the magnetic circuit structure, so that the voice coil vibrates to drive the annular vibrating diaphragm to vibrate.

With reference to any one of the first aspect to the fifth possible implementation of the first aspect, in an eighth possible implementation of the first aspect, the magnetic circuit structure includes a magnetic conductive base, an inner ring magnet, an outer ring magnet, an inner ring magnetic conductive plate, and an outer ring magnetic conductive plate. The inner ring magnet and the outer ring magnet are coaxially mounted on the magnetic conductive base at an interval. The inner ring magnetic conductive plate and the outer ring magnetic conductive plate are respectively mounted on the inner ring magnet and the outer ring magnet. The inner ring magnetic conductive plate is separated from the outer ring magnetic conductive plate. The annular air gap is formed between a component including the inner ring magnet and the inner ring magnetic conductive plate and a component including the inner ring magnet and the inner ring magnetic conductive plate. An end that is of the annular air gap and that is close to the inner ring magnetic conductive plate forms an opening for the voice coil to extend into. The magnetic conductive base is mounted on the cone frame. The magnetic circuit structure can generate a magnetic line passing through the annular air gap, referred to as a first magnetic field. The voice coil extends at least partly through the opening of the annular air gap to generate a second magnetic field when an audio current passes through the voice coil. The second magnetic field of the voice coil interacts with the first magnetic field of the magnetic circuit structure, so that the voice coil vibrates to drive the annular vibrating diaphragm to vibrate.

With reference to any one of the first aspect to the eighth possible implementation of the first aspect, in a ninth possible implementation of the first aspect, a bracket is arranged in the middle of a side that is of the magnetic circuit structure and that faces the annular vibrating diaphragm, and the second sounding unit is mounted on the bracket. In this way, the position of the second sounding unit is raised by a specific distance relative to the magnetic circuit structure, so that the joint between the annular vibrating diaphragm and the voice coil, and the second sounding unit remain coplanar.

With reference to the ninth possible implementation of the first aspect, in a tenth possible implementation of the first aspect, an axial through hole is provided in the middle of the magnetic circuit structure, the bracket includes a mounting groove for mounting the second sounding unit, and the mounting groove is in communication with the axial through hole. An inner side of the second sounding unit is in communication with the outside through the axial through hole of the magnetic circuit structure, to reduce negative pressure on the inner side of the second sounding unit, so that atmospheric pressure on two sides of the second sounding unit is close, thereby improving an output sound effect of the second sounding unit.

With reference to the tenth possible implementation of the first aspect, in an eleventh possible implementation of the first aspect, a side wall of the bracket includes a vent hole, and the annular air gap is in communication with the axial through hole through the vent hole. In this way, an inner side of the annular vibrating diaphragm is in communication with the outside through the vent hole of the bracket and the axial through hole of the magnetic circuit structure, to reduce negative pressure on the inner side of the annular vibrating diaphragm, so that atmospheric pressure on two sides of the annular vibrating diaphragm is close, thereby improving an output sound effect of the first sounding unit.

With reference to any one of the ninth possible implementation to the eleventh possible implementation of the first aspect, in a twelfth possible implementation of the first aspect, the bracket includes a first positioning groove, and the cone frame includes a second positioning groove. A first support ring is arranged in the first positioning groove, and a second support ring is arranged in the second positioning groove. An inner edge of the annular vibrating diaphragm is connected to the first support ring, and an outer edge of the annular vibrating diaphragm is connected to the second support ring. In this way, the bass vibration sound source surface at the joint between the voice coil and the annular vibrating diaphragm is as coplanar as possible with the treble vibration sound source surface of the second sounding unit. In this way, axial space can be effectively utilized. The structure is compact, and the inner edge and the outer edge of the annular vibrating diaphragm are higher than the joint between the voice coil and the annular vibrating diaphragm. More space for the annular vibrating diaphragm to vibrate can be formed, to improve the output sound effect of the first sounding unit.

With reference to any one of the first possible implementation to the twelfth possible implementation of the first aspect, in a thirteenth possible implementation of the first aspect, the annular vibrating diaphragm includes a first annular portion and a second annular portion that are coaxially arranged. An outer edge of the first annular portion is connected to an inner edge of the second annular portion. A radial cross section of the first annular portion and/or a radial cross section of the second annular portion are/is arched. The voice coil is connected to a joint between the first annular portion and the second annular portion. Both an inner concave surface of the first annular portion and an inner concave surface of the second annular portion are arranged facing the magnetic circuit structure, to improve rigidity of the annular vibrating diaphragm and reliability of up-and-down vibration of the annular vibrating diaphragm. It can be understood that the radial cross section of the first annular portion or the radial cross section of the second annular portion may be separately configured as an arch, so that the rigidity of the annular vibrating diaphragm can also be improved.

With reference to any one of the first possible implementation to the thirteenth possible implementation of the first aspect, in a fourteenth possible implementation of the first aspect, the second sounding unit is a micro-electromechanical speaker, a piezoelectric ceramic sounding piece, an electrostatic speaker, or a flat-panel speaker. Such second sounding units are compact in structure, occupy less space, and are easily assembled in the middle of the side of the magnetic circuit structure of the first sounding unit, so that the second sounding unit and the first sounding unit are integrated, to improve the sound effect and reduce space occupied by the loudspeaker.

With reference to any one of the first possible implementation to the fourteenth possible implementations of the first aspect, in a fifteenth possible implementation of the first aspect, a ratio of an outer diameter of the cone frame to a distance between a bottom surface of the magnetic circuit structure and the bass vibration sound source surface ranges from 1 to 9. In the loudspeaker, the second sounding unit and the first sounding unit are arranged coaxially, and the treble vibration sound source surface and the bass vibration sound source surface are coplanar, to fully utilize the axial space, meet requirements for both treble and bass, and improve a high frequency response.

With reference to any one of the first possible implementation to the fifteenth possible implementation of the first aspect, in a sixteenth possible implementation of the first aspect, the cone frame includes a through hole, and the magnetic circuit structure is at least partly assembled in the through hole. A baffle arm is arranged on an inner wall of the through hole, the magnetic circuit structure includes a limiting groove, and the baffle arm and the limiting groove are clamped and matched to limit a position of the magnetic circuit structure relative to the cone frame. After the magnetic circuit structure is assembled, the magnetic circuit structure is inserted into the through hole from a bottom end of the cone frame. When the baffle arm of the cone frame is mounted in the limiting groove of the magnetic circuit structure, the baffle arm blocks the magnetic circuit structure, to implement axial and circumferential positioning of the magnetic circuit structure.

With reference to any one of the first possible implementation to the sixteenth possible implementation of the first aspect, in a seventeenth possible implementation of the first aspect, the cone frame includes a first air hole in communication with the annular air gap, and a first porous damping layer configured to cover the first air hole. The magnetic circuit structure includes a second air hole in communication with the annular air gap, and a second porous damping layer configured to cover the second air hole. In the solutions, the air flow through the air holes can be adjusted to control a bass resonance frequency. It can be understood that the cone frame includes the first air hole covered with the first porous damping layer, or the magnetic circuit structure includes the second air hole covered with the second porous damping layer. In the two solutions, the bass resonance frequency can also be controlled.

According to a second aspect, an embodiment of this application provides an electronic device, including the foregoing loudspeaker.

The loudspeaker in the electronic device according to this embodiment of this application has a small axial size, to improve the space utilization. This can reduce a phase difference between sounds of different frequencies that are output by the first sounding unit and the second sounding unit, and contribute to a more accurate sense of a spatial position of a musical instrument. The voice coil and the annular vibrating diaphragm are elastically supported on the cone frame through the elastic suspension. This facilitates vibration of the voice coil and the annular vibrating diaphragm in the predetermined range, to reduce swinging polarization, and improve reliability.

DESCRIPTION OF EMBODIMENTS

Figure 1:
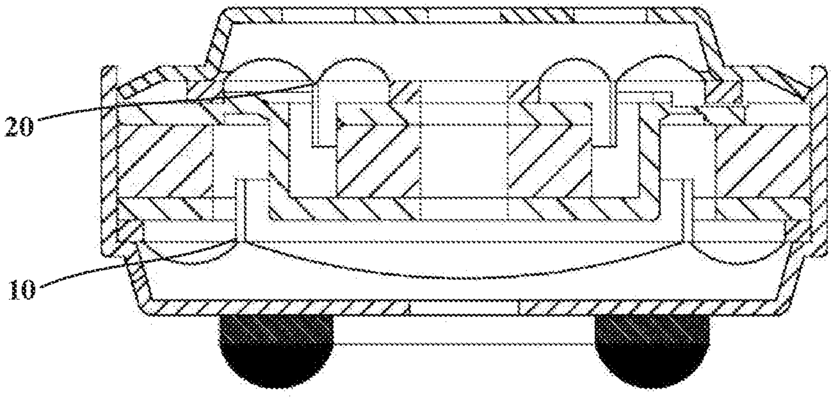
FIG. 1, FIG. 2, and FIG. 3 are respectively three schematic diagrams of structures of three types of loudspeakers according to current technologies.
Figure 2:
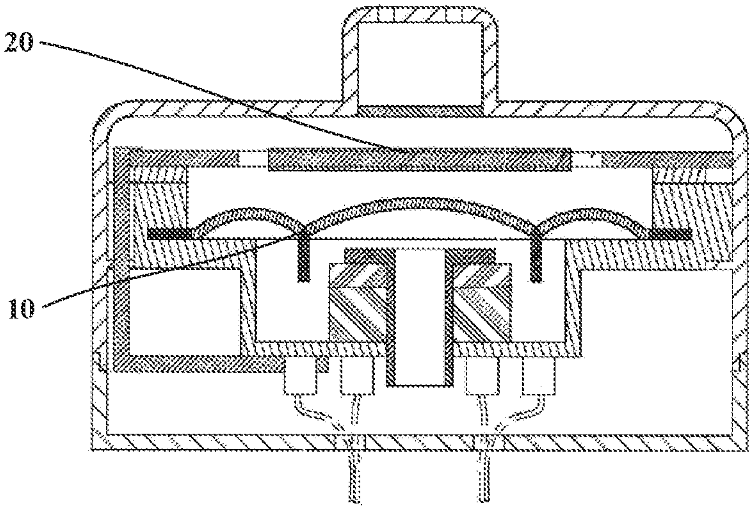
Figure 3:
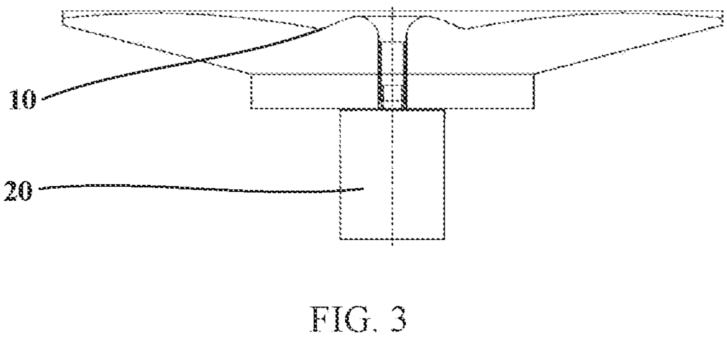
Figure 4:
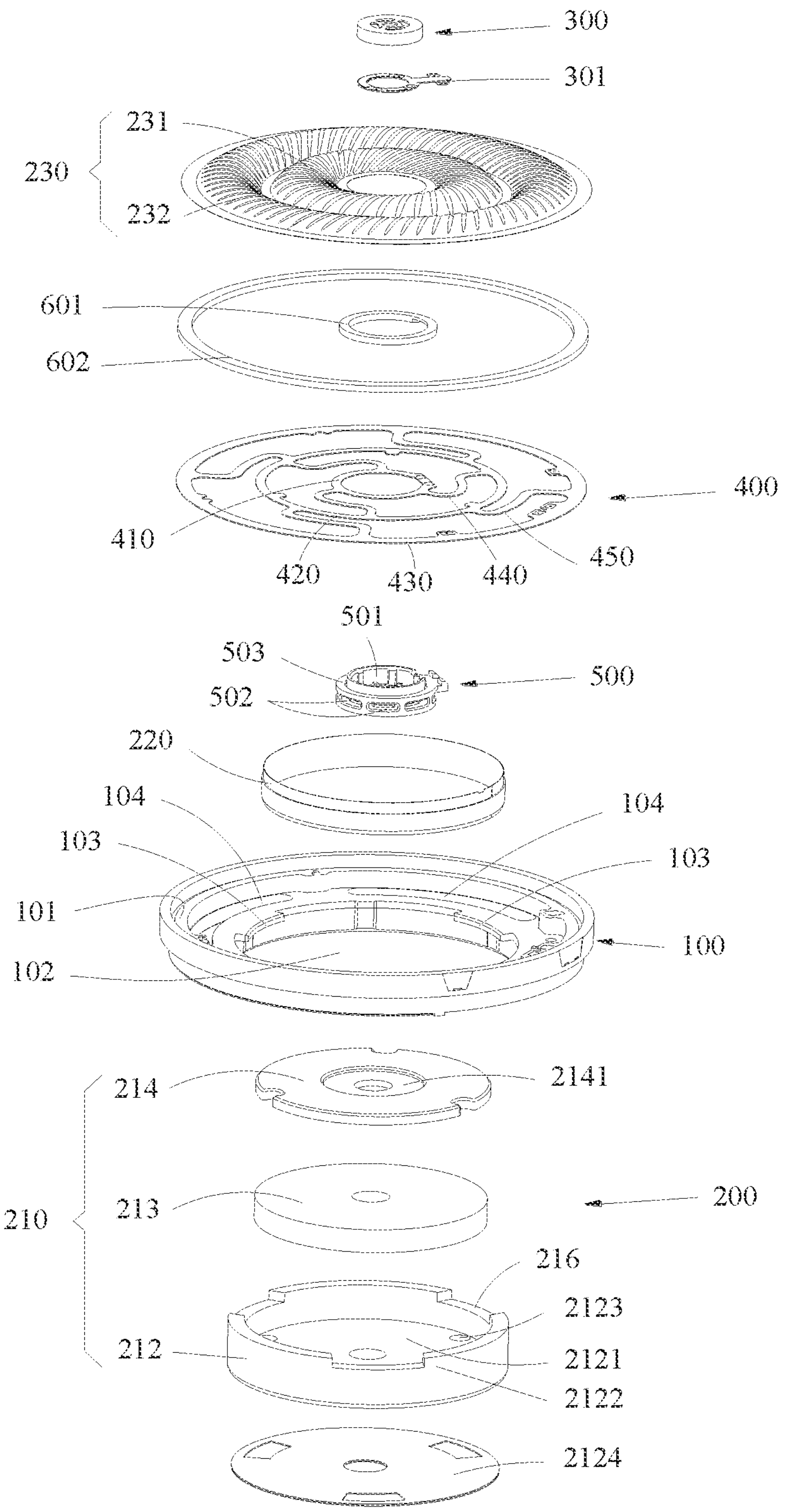
FIG. 4 is a three-dimensional exploded view of a loudspeaker according to an embodiment of this application.
Figure 5:
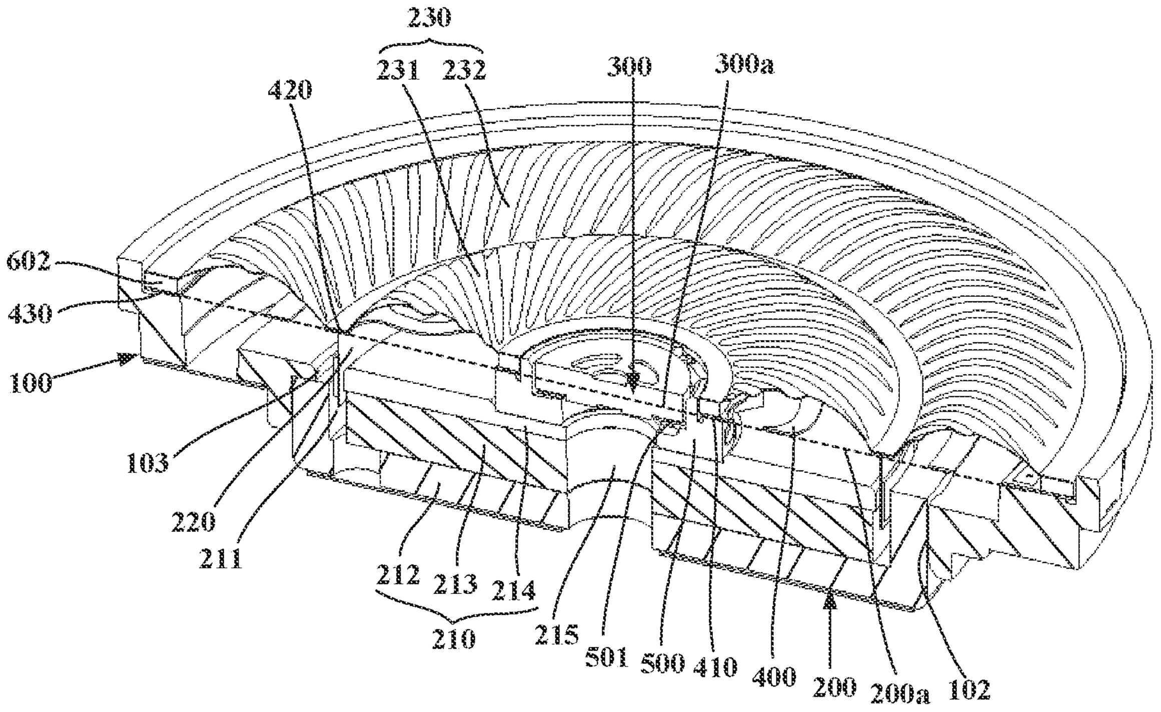
FIG. 5 is a three-dimensional sectional view of a loudspeaker according to an embodiment of this application.
Figure 6:
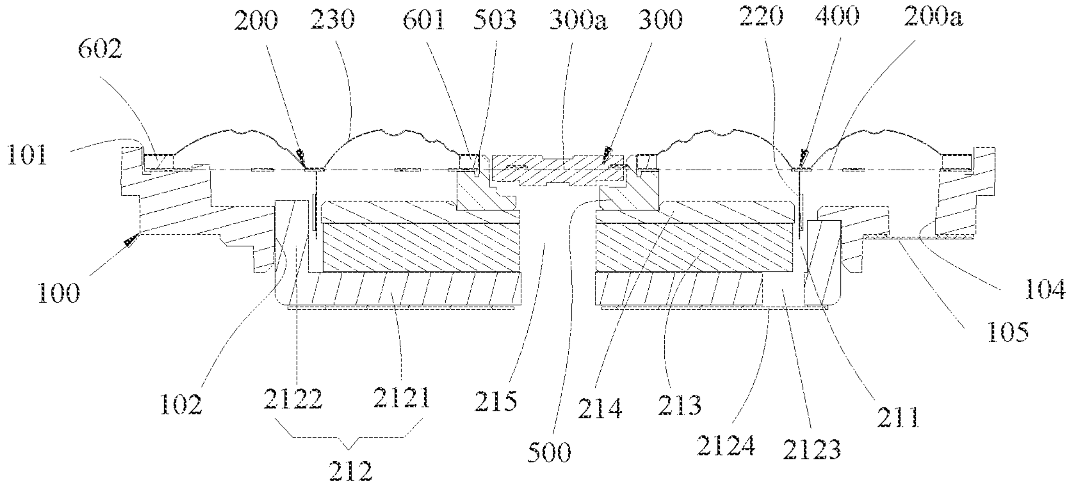
FIG. 6 is a sectional view of a loudspeaker according to an embodiment of this application.

Refer to FIG. 4 to FIG. 6, an embodiment of this application provides a loudspeaker, where the loudspeaker includes a cone frame 100, a first sounding unit 200, a second sounding unit 300, and an elastic suspension 400. The first sounding unit 200 includes a magnetic circuit structure 210, a voice coil 220, and an annular vibrating diaphragm 230. The magnetic circuit structure 210 is mounted on the cone frame 100, and the magnetic circuit structure 210 includes an annular air gap 211. The annular vibrating diaphragm 230 is separated from the magnetic circuit structure 210. The voice coil 220 is connected to the annular vibrating diaphragm 230. At least a part of the voice coil 220 is accommodated in the annular air gap 211. A bass vibration sound source surface 200*a* is formed at a joint between the voice coil 220 and the annular vibrating diaphragm 230. The voice coil 220 is configured to generate, when an audio current passes through the voice coil 220 in a first magnetic field provided by the magnetic circuit structure 210, a second magnetic field that changes with the audio current, the second sounding unit 300 and the first sounding unit 200 are arranged coaxially. The second sounding unit 300 is mounted in the middle of a side that is of the magnetic circuit structure 210 and that faces the annular vibrating diaphragm 230. A sound frequency of the second sounding unit 300 is greater than a sounding frequency of the first sounding unit 200. The second sounding unit 300 includes a treble vibration sound source surface 300*a*. The treble vibration sound source surface 300*a* and the bass vibration sound source surface 200*a* are coplanar. The elastic suspension 400 is configured to elastically support the voice coil 220 and the annular vibrating diaphragm 230 on the cone frame 100.

In the loudspeaker according to embodiments of this application, a moving coil speaker is used as the first sounding unit 200, and the second sounding unit 300 is arranged in the middle of a side of a magnetic circuit structure 210 of the first sounding unit 200. Because the first sounding unit 200 and the second sounding unit 300 can respectively output sounds of different frequencies, the loudspeaker can meet requirements for both treble and bass, improving high-frequency extension and low-frequency dive performance. Compared with a conventional loudspeaker in which a treble unit and a bass unit are stacked axially, the second sounding unit 300 in the loudspeaker according to embodiments of this application is located in the middle of a side of the magnetic circuit structure 210, so that the loudspeaker has a small axial size, and has an overall thickness close to a thickness of a single moving coil unit, to improve space utilization. The second sounding unit 300 and the first sounding unit 200 are coaxially arranged. The treble vibration sound source surface 300*a* of the second sounding unit 300 and the bass vibration sound source surface 200*a* of the first sounding unit 200 are coplanar. This can reduce sound separation caused by a phase difference between sounds of different frequencies that are output by different units, and contribute to a more accurate sense of a spatial position of a musical instrument. The voice coil 220 and the annular vibrating diaphragm 230 are elastically supported on the cone frame 100 through the elastic suspension 400. This facilitates vibration of the voice coil 220 and the annular vibrating diaphragm 230 in a predetermined range, to reduce swinging polarization, and improve reliability.

The second sounding unit 30 and the first sounding unit 200 are arranged coaxially, and a specific deviation is allowed between the axes of the two units. The treble vibration sound source surface 300*a* and the bass vibration sound source surface 200*a* are coplanar, and a specific deviation is allowed between the two vibration sound source surfaces. The closer the treble vibration sound source surface 300*a* and the bass vibration sound source surface 200*a* are coplanar, the smaller the phase difference between sounds of different frequencies that are respectively output by the first sounding unit 200 and the second sounding unit 3M), to reduce and suppress separation of the sounds of different frequencies.

The first sounding unit 200 and the second sounding unit 300 can respectively output sounds of different frequencies. For example, the voice coil 220 in the first sounding unit 200 can vibrate at a first frequency, so that the first sounding unit 200 generates a low-frequency sound. The second sounding unit 300 can vibrate at a second frequency, to generate a middle-frequency sound and a high-frequency sound. For example, the first frequency is 50 Hz (Hz) to 5000 Hz. For example, the second frequency is 300 Hz to 20000 Hz. A specific sounding frequency is not limited herein.

In the first sounding unit 200, the magnetic circuit structure 210 is configured to provide the first magnetic field. The voice coil 220 is configured to generate, when an audio current passes through the voice coil 220 in a first magnetic field provided by the magnetic circuit structure 210, a second magnetic field that changes with the audio current. The second magnetic field interacts with the first magnetic field provided by the magnetic circuit structure 210, so that the voice coil 220 vibrates with the audio current in the first magnetic field of the magnetic circuit structure 210. The voice coil 220 is connected to the annular vibrating diaphragm 230, and the voice coil 220 drives the annular vibrating diaphragm 230 to vibrate, to further generate a sound with a same current waveform as the original audio current.

Figure 7:
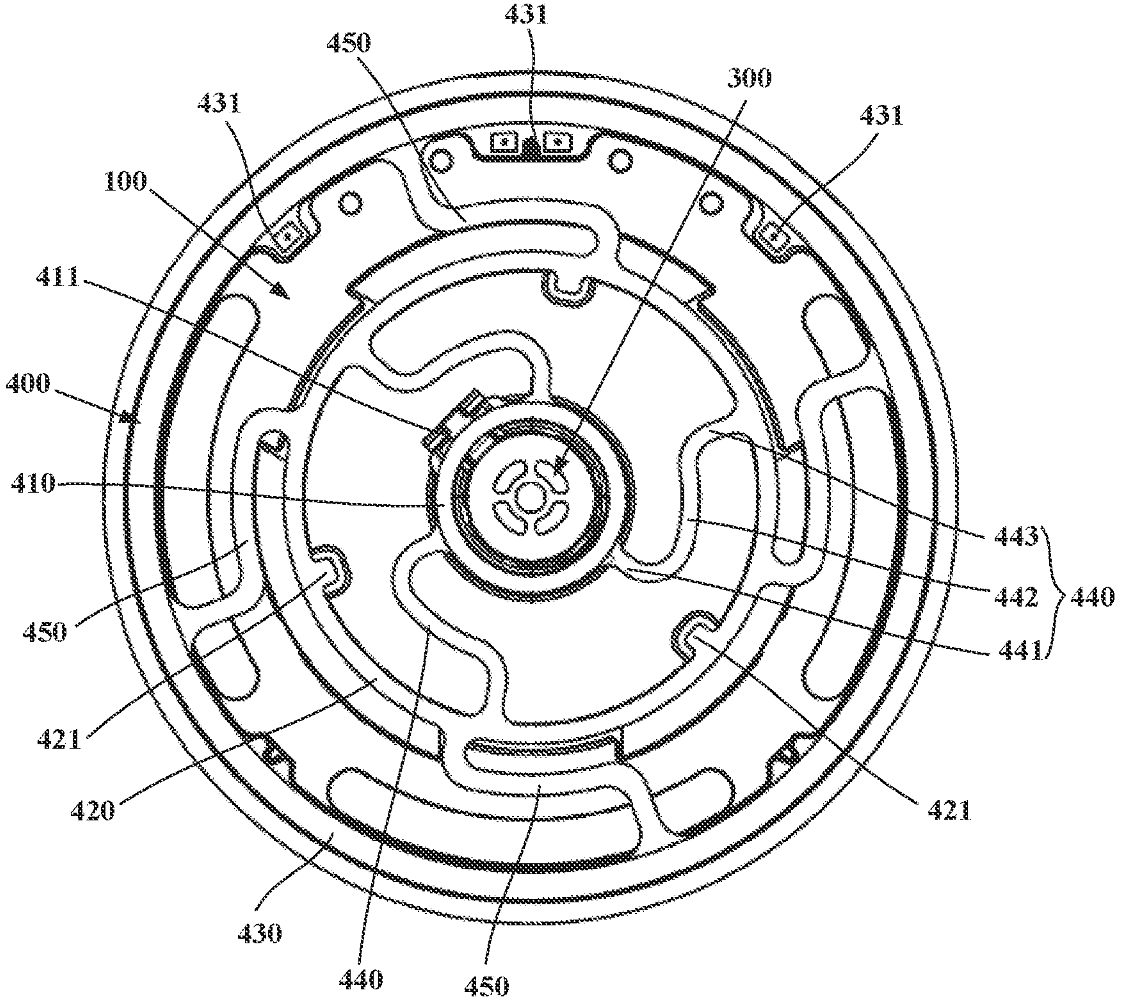
FIG. 7 is a schematic diagram of a structure of a loudspeaker with an annular vibrating diaphragm being removed according to an embodiment of this application, and (a), (b), and (c) in FIG. 8 are respectively a front view, a top view, and a bottom view of a loudspeaker according to an embodiment of this application.

When the elastic suspension is specifically arranged, refer to FIG. 7, the elastic suspension 400 includes an inner ring portion 410, a middle ring portion 420, and an outer ring portion 430 that are coaxially arranged, a first cantilever 440 connected between the inner ring portion 410 and the middle ring portion 420, and a second cantilever 450 connected between the middle ring portion 420 and the outer ring portion 430, where the first cantilever 440 and the second cantilever 450 are arranged in a suspended manner. The annular structures such as the inner ring portion 410, the middle ring portion 420, and the outer ring portion 430 may be circular, oval, polygonal, rounded rectangle, and the like. For example, such annular structures are all configured as circular, where a diameter of the outer ring portion 430 is greater than a diameter of the middle ring portion 420, and the diameter of the middle ring portion 420 is greater than a diameter of the inner ring portion 410. The diameter herein refers to an average of the inner diameter and the outer diameter of the annular structure. Refer to FIG. 5. A diameter of the voice coil 220 is close to the diameter of the middle ring portion 420, and the voice coil 220 is connected to the middle ring portion 420. The inner ring portion 410 is arranged close to the second sounding unit 300, and the outer ring portion 430 is connected to the cone frame 100. When the voice coil 220 vibrates up and down in the annular air gap 211, the middle ring portion 420 and a joint between the annular vibrating diaphragm 230 and the middle ring portion 420 follow the vibration. The first cantilever 440 and the second cantilever 450 respectively pull on an inner side and an outer side of the middle ring portion 420, guiding the voice coil 220 and the annular vibrating diaphragm 230 to vibrate in the predetermined range, to effectively reduce swinging polarization or even breaking of the voice coil 220, and improve the reliability of the first sounding unit 200.

For example, the elastic suspension 400 may be integrally formed, and this facilitates mass production. Alternatively, the elastic suspension 400 may be divided into a plurality of components that are connected by welding. For example, the inner ring portion 410, the middle ring portion 420, the outer ring portion 430, the first cantilever 440, and the second cantilever 450 are all independent components, and the components are connected to form the elastic suspension 400 as a whole. This manner is suitable for making an elastic suspension 400 with a large radial dimension.

For example, the annular vibrating diaphragm 230 and the voice coil 220 may be respectively connected to two sides of the middle ring portion 420, so that the voice coil 220 is connected to the annular vibrating diaphragm 230. For example, the voice coil 220 is welded to a side of the middle ring portion 420, and the annular vibrating diaphragm 230 is bonded to the other side of the middle ring portion 420, to form a dual-compliance system that effectively controls swing. The voice coil 220 and the annular vibrating diaphragm 230 are elastically supported on the cone frame 100 through the elastic suspension 400.

In some embodiments, to improve efficiency of assembling the voice coil and the second sounding unit, refer to FIG. 5 and FIG. 7, the elastic suspension 400 is configured as a flexible circuit board for providing an audio current for the voice coil 220 and the second sounding unit 300. The outer ring portion 430 has an input terminal 431. The voice coil 220 and the middle ring portion 420 are electrically connected, and the second sounding unit 300 and the inner ring portion 410 are electrically connected. The flexible circuit board is provided with a power-on conductor (not shown in the figure) and a plurality of groups of positive and negative terminals 411 and 421. During assembly, the voice coil 220 and the second sounding unit 300 are respectively arranged in the middle ring portion 420 and the inner ring portion 410, and corresponding positive and negative terminals are welded. Ends of the voice coil 220 are connected to positive and negative terminals 421 of the middle ring portion 420. The second sounding unit 300 is connected to positive and negative terminals 411 of the inner ring portion 410. The input terminal 431 of the outer ring portion 430 is connected to an external circuit. In this way, the line is connected to implement signal transmission without manually leading the voice coil 220 and the second sounding unit 300, to reduce process difficulty, improve assembly efficiency and reliability, and facilitate the automation process.

For example, refer to FIG. 4, the second sounding unit 300 may be provided with an auxiliary flexible circuit board 301, and the auxiliary flexible circuit board 301 is welded to the inner ring portion 410 of the elastic suspension 40, to facilitate manufacturing of the elastic suspension 400. The auxiliary flexible circuit board 301 is bendable. This facilitates assembly of the second sounding unit 300 and the elastic suspension 400. The second sounding unit 300 is adjusted to a predetermined position, so that the bass vibration sound source surface 200*a* and the treble vibration sound source surface 300*a* are as coplanar as possible. In addition, the second sounding unit 300 may be directly integrated on the inner ring portion 410 of the elastic suspension 400.

For example, refer to FIG. 7, two groups of input terminals 431 may be arranged on the outer ring portion 430 of the elastic suspension 400, and are respectively used as signal input ends of the second sounding unit 300 and the voice coil 220, to implement separate transmission of different audio signals. It can be understood that one or more groups of input terminals 431 may be arranged on the outer ring portion 430 to implement signal transmission.

Figure 8:
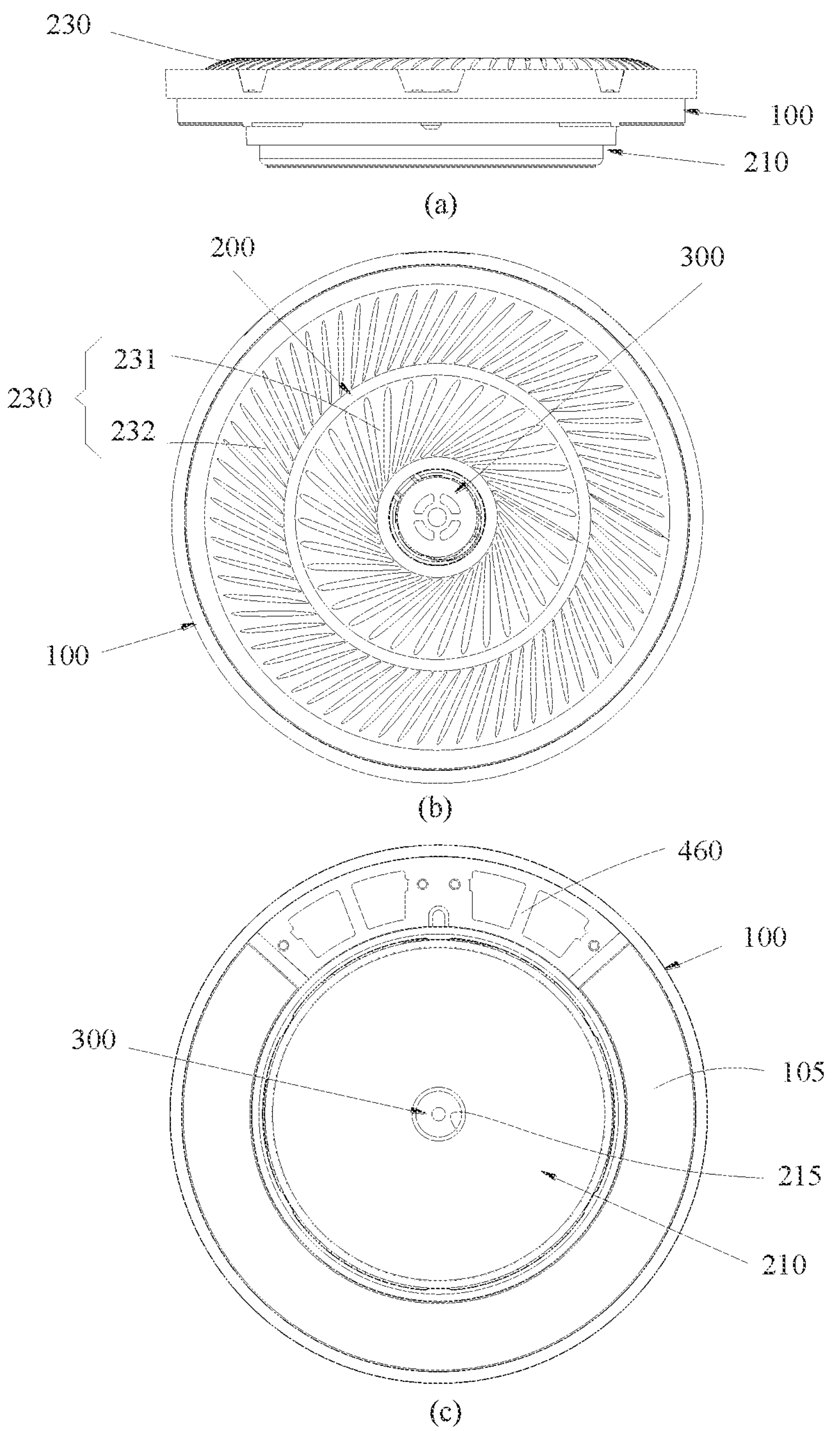

In addition, the flexible circuit board and a system in a package (System In a Package, SIP) chip may be electrically connected, to drive the first sounding unit 200 and the second sounding unit 300. Refer to FIG. 8, a wiring board 460 may be arranged on a side of the cone frame 100 opposite to the annular vibrating diaphragm 230 or an outer wall of the magnetic conductive base. The wiring board 460 and the flexible circuit board are electrically connected. The wiring board includes a wiring terminal, to facilitate connection between the loudspeaker and an external circuit.

In some embodiments, to improve an anti-fatigue capability of the cantilevers and configure the cantilevers of the elastic suspension relatively long in the limited space, refer to FIG. 7, both the first cantilever 440 and the second cantilever 450 are arranged in a winding manner. Taking the first cantilever 440 as an example for description, the first cantilever 440 includes a first radial extending arm 441, a circumferential extending arm 442, and a second radial extending arm 443 that are sequentially connected, where the first radial extending arm 441 and the second radial extending arm 443 are arranged in different radial directions. In this way, the first cantilever 440 can be configured relatively long to meet a requirement for tight space. *Ibis* is similar for the second cantilever 450, and details are not repeated herein.

In some embodiments, the cantilevers are arranged in the centrosymmetric manner, so that radial vibration on two sides of the voice coil is symmetrical, to effectively reduce and suppress swing, and improve sound quality. Refer to FIG. 7. There are a plurality of first cantilevers 440, and the plurality of first cantilevers 440 are symmetrically arranged with the axis of the middle ring portion 420 as the center. There are a plurality of second cantilevers 450, and the plurality of second cantilevers 450 are symmetrically arranged with the axis of the middle ring portion 420 as the center. In other words, the first cantilevers 440 are bent in a same manner, and the second cantilevers 450 are bent in a same manner. For example, three first cantilevers 440 are arranged in the centrosymmetric manner between the inner ring portion 410 and the middle ring portion 420, and four second cantilevers 450 are arranged in the centrosymmetric manner between the middle ring portion 420 and the outer ring portion 430. A specific quantity of cantilevers is not limited.

For example, the elastic suspension, the voice coil, the annular vibrating diaphragm, and the magnetic circuit structure all use a centrosymmetric structure, so that three factors including mass, compliance, and magnetic field strength are completely centrosymmetric, to improve output sound quality of the first sounding unit. The compliance refers to softness of axial movement of a vibrating member.

In some embodiments, to increase a sounding area of the first sounding unit to obtain better sound quality, refer to FIG. 7, a ratio of a diameter difference between the outer ring portion 430 and the middle ring portion 420 to a diameter difference between the middle ring portion 420 and the inner ring portion 410 ranges from 0.6 to 1.4. The diameter herein refers to an average of the inner diameter and the outer diameter of the annular structure. In this way, the voice coil 220 is roughly arranged at a middle position between an inner edge and an outer edge of the annular vibrating diaphragm 230, to increase a sounding area of the first sounding unit 200, and improve a sounding effect of the first sounding unit 200.

There are a plurality of optional implementations when the magnetic circuit structure of the first sounding unit is arranged. The first magnetic circuit structure is an internal magnetic structure, to be specific, a magnet is arranged inside the voice coil. Refer to FIG. 4 and FIG. 6. The magnetic circuit structure 210 includes a magnetic conductive base 212, a magnet 213, and a magnetic conductive plate 214. The magnetic conductive base 212 includes a plate-shaped portion 2121 and a cylindrical portion 2122 connected to an outer edge of the plate-shaped portion 2121. The magnet 213 is mounted on the plate-shaped portion 2121. The magnetic conductive plate 214 is mounted on the magnet 213. Both an outer peripheral surface of the magnet 213 and an outer peripheral surface of the magnetic conductive plate 214 are separated from an inner wall of the cylindrical portion 2122 and form the annular air gap 211. An end that is of the annular air gap 211 and that is close to the magnetic conductive plate 214 forms an opening for the voice coil 220 to extend into. The cylindrical portion 2122 is mounted on the cone frame 100. The magnet 213 is axially magnetized, and the magnetic circuit structure 210 can generate a magnetic line passing through the annular air gap 211, referred to as a first magnetic field.

For example, the magnetic force line may be emitted from the bottom end of the magnet 213, reach the top end of the cylindrical portion 2122 through the plate-shaped portion 2121, alongside the cylindrical portion 2122, of the magnetic conductive base 212, pass through the annular air gap 211, and eventually return to the top end of the magnet 213. The voice coil 220 extends at least partly through the opening of the annular air gap 211 to generate, a second magnetic field when an audio current passes through the voice coil 220. The second magnetic field of the voice coil 220 interacts with the first magnetic field of the magnetic circuit structure 210, so that the voice coil 220 vibrates to drive the annular vibrating diaphragm 230 to vibrate.

The second magnetic circuit structure is an external magnetic structure, to be specific, a magnet is arranged outside the voice coil. The magnetic circuit structure includes a magnetic conductive base, an annular magnet and a magnetic conductive ring. The magnetic conductive base includes a plate-shaped portion and a columnar portion connected to the middle of the plate-shaped portion. The annular magnet is mounted on the plate-shaped portion. The magnetic conductive ring is mounted on the annular magnet. Both an inner peripheral surface of the annular magnet and an inner peripheral surface of the magnetic conductive ring are separated from an outer peripheral surface of the columnar portion and form the annular air gap. An end that is of the annular air gap and that is close to the magnetic conductive ring forms an opening for the voice coil to extend into. The magnetic conductive base is mounted on the cone frame. The annular magnet is axially magnetized, and the magnetic circuit structure can generate a magnetic line passing through the annular air gap, referred to as the first magnetic field.

For example, the magnetic line may be emitted from a bottom end of the magnet, reach a top end of the columnar portion through the plate-shaped portion of the magnetic conductive base along the columnar portion, pass through the annular air gap, and finally return to a top end of the magnet. The voice coil extends at least partly through the opening of the annular air gap to generate a second magnetic field when an audio current passes through the voice coil. The second magnetic field of the voice coil interacts with the first magnetic field of the magnetic circuit structure, so that the voice coil vibrates to drive the annular vibrating diaphragm to vibrate.

A third magnetic circuit structure is an internal and external magnetic structure, to be specific, magnets are arranged on two sides of the voice coil. The magnetic circuit structure includes a magnetic conductive base, an inner ring magnet, an outer ring magnet, an inner ring magnetic conductive plate, and an outer ring magnetic conductive plate. The inner ring magnet and the outer ring magnet are coaxially mounted on the magnetic conductive base at an interval. The inner ring magnetic conductive plate and the outer ring magnetic conductive plate are respectively mounted on the inner ring magnet and the outer ring magnet. The inner ring magnetic conductive plate is separated from the outer ring magnetic conductive plate. The annular air gap is formed between a component including the inner ring magnet and the inner ring magnetic conductive plate and a component including the inner ring magnet and the inner ring magnetic conductive plate. An end that is of the annular air gap and that is close to the inner ring magnetic conductive plate forms an opening for the voice coil to extend into. The magnetic conductive base is mounted on the cone frame. The inner ring magnet and the outer ring magnet are axially magnetized, and the magnetic circuit structure can generate a magnetic line passing through the annular air gap, referred to as a first magnetic field.

For example, the magnetic line may be emitted from a bottom end of the inner ring magnet, sequentially pass through the magnetic conductive base, the outer ring magnet, and the outer ring magnetic conductive plate, pass through the annular air gap, enter the inner ring magnet, and return to a top end of the inner ring magnet. The voice coil extends at least partly through the opening of the annular air gap to generate a second magnetic field when an audio current passes through the voice coil. The second magnetic field of the voice coil interacts with the first magnetic field of the magnetic circuit structure, so that the voice coil vibrates to drive the annular vibrating diaphragm to vibrate.

When the second sounding unit is mounted, to enable the treble vibration sound source surface and the bass vibration sound source surface to be coplanar, refer to FIG. 4, a bracket 500 is arranged in the middle of a side that is of the magnetic circuit structure 210 and that faces the annular vibrating diaphragm 230, and the second sounding unit 300 is mounted on the bracket 500. In this way, the position of the second sounding unit 300 is raised by a specific distance relative to the magnetic circuit structure 210, so that the joint between the annular vibrating diaphragm 230 and the voice coil 220, and the second sounding unit 300 remain coplanar. An outer diameter of the bracket 500 is smaller than an outer diameter of the cone frame 100, as long as the bracket 500 can support the second sounding unit 300.

For example, when the first magnetic circuit structure 210 is used, an upper side of the magnetic circuit structure 210 is the magnetic conductive plate 214, and an assembly groove 2141 is arranged on an upper surface of the magnetic conductive plate 214, to facilitate positioning and assembly of the bracket 500, and further improve assembly efficiency. It can be understood that, when another magnetic circuit structure is used, an assembly groove may also be arranged, to position and assemble the bracket.

When the elastic suspension 400 is mounted, the inner ring portion 410 of the elastic suspension 400 may be connected to the bracket 500, and the outer ring portion 430 may be connected to the cone frame 100, to facilitate the assembly of the elastic suspension 400, and enlarge the elastic suspension 400 in limited space. Correspondingly, the first cantilever 440 and the second cantilever 450 may be made longer to meet a requirement of the elastic suspension 400 for elastic support of the voice coil 220 and the annular vibrating diaphragm 230.

In some embodiments, to make atmospheric pressure on two sides of the second sounding unit close to obtain better sound quality, refer to FIG. 5, an axial through hole 215 is provided in the middle of the magnetic circuit structure 210, the bracket 500 includes a mounting groove 501 configured to mount the second sounding unit 300, and the mounting groove 501 is in communication with the axial through hole 215. In this way, the second sounding unit 300 can be stably assembled in the mounting groove 501, and an inner side of the second sounding unit 300 is in communication with the outside through the axial through hole 215 of the magnetic circuit structure 210, to reduce negative pressure on the inner side of the second sounding unit 300, so that atmospheric pressure on two sides of the second sounding unit 300 is close, thereby improving an output sound effect of the second sounding unit 300. The second sounding unit 300 may be assembled on the bracket 500 by bonding, clamping, tight fitting, or in another manner.

For example, w % ben the first magnetic circuit structure 210 is used, vias are respectively provided in the middle of the plate-shaped portion 2121 of the magnetic conductive base 212, the middle of the magnet 213, and the middle of the magnetic conductive plate 214, so that the axial through hole 215 of the magnetic circuit structure 210 can be formed. When another magnetic circuit structure is used, vias are provided on corresponding structures to form an axial through hole, to further match the mounting groove of the bracket, so that the inner side of the second sounding unit is in communication with the outside.

In some embodiments, to make atmospheric pressure on two sides of the annular vibrating diaphragm of the first sounding unit close to obtain better sound quality, refer to FIG. 4 and FIG. 5, a side wall of the bracket 500 includes a vent hole 502, and the annular air gap 211 is in communication with the axial through hole 215 through the vent hole 502. In this way, an inner side of the annular vibrating diaphragm 230 is in communication with the outside through the vent hole 502 of the bracket 500 and the axial through hole 215 of the magnetic circuit structure 210, to reduce negative pressure on the inner side of the annular vibrating diaphragm 230, so that atmospheric pressure on two sides of the annular vibrating diaphragm 230 is close, thereby improving an output sound effect of the first sounding unit 200. For example, the bracket 500 is roughly cylindrical, and a plurality of vent holes 502 may be provided on a side wall of the bracket 500 along a circumferential direction, to facilitate gas flow between the annular air gap 211 and the axial through hole 215.

When the annular vibrating diaphragm is assembled on the bracket and the cone frame, refer to FIG. 6, the bracket 500 includes a first positioning groove 503, and the cone frame 100 includes a second positioning groove 101, where a first support ring 601 is arranged in the first positioning groove 503, and a second support ring 602 is arranged in the second positioning groove 101; and an inner edge of the annular vibrating diaphragm 230 is connected to the first support ring 601, and an outer edge of the annular vibrating diaphragm 230 is connected to the second support ring 602. This facilitates mounting the annular vibrating diaphragm 230 to the bracket 500 and the cone frame 100, so that the bass vibration sound source surface **200*a* at the connection between the voice coil 220 and the annular vibrating diaphragm 230 to be as coplanar with the treble vibration sound source surface 300*a* of the second sounding unit 300 as possible. The first support ring 601 and the second support ring 602 are respectively arranged in the first positioning groove 503 and the second positioning groove 101. In this way, the axial space can be effectively utilized, and the structure is compact. In addition, the inner edge and the outer edge of the annular vibrating diaphragm 230 are higher than the joint between the voice coil 220 and the annular vibrating diaphragm 230. More space for the annular vibrating diaphragm 230 to vibrate can be formed, to improve the output sound effect of the first sounding unit 200. The shapes of the first support ring 601 and the second support ring 602 are arranged based on the shape of the annular vibrating diaphragm 230**.

In some embodiments, a double-arched diaphragm may be used to increase the rigidity of the annular vibrating diaphragm. Referring to FIG. 5, the annular vibrating diaphragm 230 includes a first annular portion 231 and a second annular portion 232 that are coaxially arranged. An outer edge of the first annular portion 231 is connected to an inner edge of the second annular portion 232. A radial cross section of the first annular portion 231 and/or a radial cross section of the second annular portion 232 are/is arched. The voice coil 220 is connected to a joint between the first annular portion 231 and the second annular portion 232. Both an inner concave surface of the first annular portion 231 and an inner concave surface of the second annular portion 232 are arranged facing the magnetic circuit structure 210, to improve rigidity of the annular vibrating diaphragm 230 and reliability of up-and-down vibration of the annular vibrating diaphragm 230. It can be understood that the radial cross section of the first annular portion 231 or the radial cross section of the second annular portion 232 may be separately configured as an arch, so that the rigidity of the annular vibrating diaphragm 230 can further be improved. The ring in the annular vibrating diaphragm 230 may be circular, oval, polygonal, rounded rectangle, and the like. The first annular portion 231 and the second annular portion 232 are arranged in corresponding shape. This is not limited herein.

When the second sounding unit is specifically arranged, refer to FIG. 5, the second sounding unit 300 is a micro-electromechanical speaker (MEMS speaker), a piezoelectric ceramic sounding piece, an electrostatic speaker, or a flat-panel speaker. Such second sounding units 300 are compact in structure, occupy less space, and are easily assembled in the middle of the side of the magnetic circuit structure 210 of the first sounding unit 200, so that the second sounding unit 300 and the first sounding unit 200 are integrated, to improve the sound effect and reduce space occupied by the loudspeaker.

When the cone frame and the first sounding unit are arranged, refer to FIG. 5, a ratio of an outer diameter of the cone frame 100 to a distance between a bottom surface of the magnetic circuit structure 210 and the bass vibration sound source surface 200*a* ranges from 1 to 9. The outer diameter of the cone frame 100 refers to a largest diameter of the cone frame 100, namely, the outer edge diameter of the cone frame 100. The bottom surface of the magnetic circuit structure 210 refers to a surface, backing onto the annular vibrating diaphragm 230, of the magnetic circuit structure 210. In the loudspeaker, the second sounding unit 300 and the first sounding unit 200 are arranged coaxially, and the treble vibration sound source surface 300*a* and the bass vibration sound source surface 200*a* are coplanar, to fully utilize the axial space, meet requirements for both treble and bass, and improve a high frequency response.

When the cone frame and the magnetic circuit structure are assembled, refer to FIG. 5, the cone frame 100 includes a through hole 102, and the magnetic circuit structure 210 is at least partly assembled in the through hole 102. A baffle arm 103 is arranged on an inner wall of the through hole 102. Refer to FIG. 4. The magnetic circuit structure 210 includes a limiting groove 216, and the baffle arm 103 and the limiting groove 216 are clamped and matched to limit a position of the magnetic circuit structure 210 relative to the cone frame 100. After the magnetic circuit structure 210 is assembled, the magnetic circuit structure 210 is inserted into the through hole 102 from a bottom end of the cone frame 100. When the baffle arm 103 of the cone frame 100 is mounted in the limiting groove 216 of the magnetic circuit structure 210, the baffle arm 103 blocks the magnetic circuit structure 210, to implement axial and circumferential positioning of the magnetic circuit structure 210. The magnetic circuit structure 210 and the cone frame 100 may be connected by bonding, clamping, tight fitting, or in another manner.

For example, when the first magnetic circuit structure 210 is used, a limiting groove 216 is arranged on an edge of one end that is of the cylindrical portion 2122 in the magnetic conductive base 212 and that is away from the plate-shaped portion 2121, and a baffle arm 103 is arranged on an edge of one end that is of the through hole 102 in the cone frame 100 and that is close to the annular vibrating diaphragm 230. When the magnetic circuit structure 210 and the cone frame 100 are assembled, the baffle arm 103 and the limiting groove 216 are clamped and matched to implement axial positioning of the magnetic circuit structure 210 and the cone frame 100.

In some embodiments, to control the bass resonance frequency, refer to FIG. 4 and FIG. 6, the cone frame 100 includes a first air hole 104 in communication with the annular air gap 211, and a first porous damping layer 105 configured to cover the first air hole 104, and the magnetic circuit structure 210 includes a second air hole 2123 in communication with the annular air gap 211, and a second porous damping layer 2124 configured to cover the second air hole 2123. In the solutions, the air flow through the air holes can be adjusted to control a bass resonance frequency. A plurality of first air holes 104 and a plurality of second air holes 2123 may be provided, and may be provided to extend in an arc shape or another shape. The first porous damping layer 105 and the second porous damping layer 2124 may be made of a porous material such as a nonwoven fabric or a micro-perforated material. It can be understood that the cone frame 100 includes the first air hole 104 covered with the first porous damping layer 105, or the magnetic circuit structure 210 includes the second air hole 2123 covered with the second porous damping layer 2124. In the two solutions, the bass resonance frequency can also be controlled.

An embodiment of this application provides an electronic device, including the foregoing loudspeaker. Refer to FIG. 5. The loudspeaker in the electronic device according to this embodiment of this application has a small axial size, to improve the space utilization. This can reduce a phase difference between sounds of different frequencies that are output by the first sounding unit 200 and the second sounding unit 300, and contribute to a more accurate sense of a spatial position of a musical instrument. The voice coil 220 and the annular vibrating diaphragm 230 are elastically supported on the cone frame 100 through the elastic suspension 400. This facilitates vibration of the voice coil 220 and the annular vibrating diaphragm 230 in a predetermined range, to reduce swinging polarization, and improve reliability. Specifically, the electronic device may be a mobile phone, a tablet computer, a smartphone, smart glasses, an AR/VR device, a hearing aid, a headset, a loudspeaker box, or the like.

It should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A loudspeaker, comprising:

a cone frame;

a first sounding unit, comprising a magnetic circuit structure mounted on the cone frame, an annular vibrating diaphragm, and a voice coil connected to the annular vibrating diaphragm, wherein the magnetic circuit structure has an annular air gap, the annular vibrating diaphragm is separated from the magnetic circuit structure, at least a part of the voice coil is accommodated in the annular air gap, a bass vibration sound source surface is formed at a joint between the voice coil and the annular vibrating diaphragm, and the voice coil is configured to generate, when an audio current passes through the voice coil in a first magnetic field provided by the magnetic circuit structure, a second magnetic field that changes with the audio current;

a second sounding unit, arranged coaxially with the first sounding unit, wherein the second sounding unit is mounted in the middle of a side that is of the magnetic circuit structure and that faces the annular vibrating diaphragm, a sounding frequency of the second sounding unit is greater than a sounding frequency of the first sounding unit, the second sounding unit comprises a treble vibration sound source surface, and the treble vibration sound source surface and the bass vibration sound source surface are coplanar; and an elastic suspension, configured to elastically support the voice coil and the annular vibrating diaphragm on the cone frame.

2. The loudspeaker according to claim 1, wherein the elastic suspension comprises an inner ring portion, a middle ring portion, and an outer ring portion that are coaxially arranged, a first cantilever connected between the inner ring portion and the middle ring portion, and a second cantilever connected between the middle ring portion and the outer ring portion, wherein the inner ring portion is arranged close to the second sounding unit, the voice coil is connected to the middle ring portion, and the outer ring portion is connected to the cone frame.

3. The loudspeaker according to claim 2, wherein the elastic suspension is a flexible circuit board configured to provide an audio current for the voice coil and the second sounding unit, the outer ring portion comprises an input terminal, the voice coil and the middle ring portion are electrically connected, and the second sounding unit and the inner ring portion are electrically connected.

4. The loudspeaker according to claim 2, wherein both the first cantilever and the second cantilever are arranged in a winding manner.

5. The loudspeaker according to claim 2, wherein there are a plurality of first cantilevers, and the plurality of first cantilevers are symmetrically arranged with an axis of the middle ring portion as a center; and there are a plurality of second cantilevers, and the plurality of second cantilevers are symmetrically arranged with the axis of the middle ring portion as a center.

6. The loudspeaker according to claim 2, wherein a ratio of a diameter difference between the outer ring portion and the middle ring portion to a diameter difference between the middle ring portion and the inner ring portion ranges from 0.6 to 1.4.

7. The loudspeaker according to claim 1, wherein the magnetic circuit structure comprises a magnetic conductive base, a magnet, and a magnetic conductive plate mounted on the magnet, wherein the magnetic conductive base comprises a plate-shaped portion and a cylindrical portion connected to an outer edge of the plate-shaped portion, the magnet is mounted on the plate-shaped portion, both an outer peripheral surface of the magnet and an outer peripheral surface of the magnetic conductive plate are separated from an inner wall of the cylindrical portion and form the annular air gap, an end that is of the annular air gap and that is close to the magnetic conductive plate forms an opening for the voice coil to extend into, and the cylindrical portion is mounted on the cone frame; or the magnetic circuit structure comprises a magnetic conductive base, an annular magnet, and a magnetic conductive ring, wherein the magnetic conductive base comprises a plate-shaped portion and a columnar portion connected to the middle of the plate-shaped portion, the annular magnet is mounted on the plate-shaped portion, the magnetic conductive ring is mounted on the annular magnet, both an inner peripheral surface of the annular magnet and an inner peripheral surface of the magnetic conductive ring are separated from an outer peripheral surface of the columnar portion and form the annular air gap, an end that is of the annular air gap and that is close to the magnetic conductive ring forms an opening for the voice coil to extend into, and the magnetic conductive base is mounted on the cone frame; or the magnetic circuit structure comprises a magnetic conductive base, an inner ring magnet, an outer ring magnet, an inner ring magnetic conductive plate, and an outer ring magnetic conductive plate, wherein the inner ring magnet and the outer ring magnet are coaxially mounted on the magnetic conductive base at an interval, the inner ring magnetic conductive plate and the outer ring magnetic conductive plate are respectively mounted on the inner ring magnet and the outer ring magnet, the inner ring magnetic conductive plate is separated from the outer ring magnetic conductive plate, an end that is of the annular air gap and that is close to the inner ring magnetic conductive plate forms an opening for the voice coil to extend into, and the magnetic conductive base is mounted on the cone frame.

8. The loudspeaker according to claim 1, wherein a bracket is arranged in the middle of a side that is of the magnetic circuit structure and that faces the annular vibrating diaphragm, and the second sounding unit is mounted on the bracket.

9. The loudspeaker according to claim 8, wherein an axial through hole is provided in the middle of the magnetic circuit structure, the bracket comprises a mounting groove for mounting the second sounding unit, and the mounting groove is in communication with the axial through hole.

10. The loudspeaker according to claim 9, wherein a side wall of the bracket comprises a vent hole, and the annular air gap is in communication with the axial through hole through the vent hole.

11. The loudspeaker according to claim 8, wherein the bracket comprises a first positioning groove, and the cone frame comprises a second positioning groove;

a first support ring is arranged in the first positioning groove, and a second support ring is arranged in the second positioning groove; and an inner edge of the annular vibrating diaphragm is connected to the first support ring, and an outer edge of the annular vibrating diaphragm is connected to the second support ring.

12. The loudspeaker according to claim 1, wherein the annular vibrating diaphragm comprises a first annular portion and a second annular portion that are coaxially arranged, an outer edge of the first annular portion is connected to an inner edge of the second annular portion, at least one of a radial cross section of the first annular portion or a radial cross section of the second annular portion is arched, and the voice coil is connected to a joint between the first annular portion and the second annular portion.

13. The loudspeaker according to claim 1, wherein the second sounding unit is a micro-electromechanical speaker, a piezoelectric ceramic sounding piece, an electrostatic speaker, or a flat-panel speaker.

14. The loudspeaker according to claim 1, wherein a ratio of an outer diameter of the cone frame to a distance between a bottom surface of the magnetic circuit structure and the bass vibration sound source surface ranges from 1 to 9.

15. The loudspeaker according to claim 1, wherein the cone frame comprises a through hole, the magnetic circuit structure is at least partly assembled in the through hole, a baffle arm is arranged on an inner wall of the through hole, the magnetic circuit structure comprises a limiting groove, and the baffle arm and the limiting groove are clamped and matched to limit a position of the magnetic circuit structure relative to the cone frame.

16. The loudspeaker according to claim 1, wherein at least one of the following is true:

the cone frame comprises a first air hole in communication with the annular air gap, and a first porous damping layer configured to cover the first air hole; or the magnetic circuit structure comprises a second air hole in communication with the annular air gap, and a second porous damping layer configured to cover the second air hole.

17. An electronic device, comprising a loudspeaker, the loudspeaker comprising:

a cone frame;

a first sounding unit, comprising a magnetic circuit structure mounted on the cone frame, an annular vibrating diaphragm, and a voice coil connected to the annular vibrating diaphragm, wherein the magnetic circuit structure has an annular air gap, the annular vibrating diaphragm is separated from the magnetic circuit structure, at least a part of the voice coil is accommodated in the annular air gap, a bass vibration sound source surface is formed at a joint between the voice coil and the annular vibrating diaphragm, and the voice coil is configured to generate, when an audio current passes through the voice coil in a first magnetic field provided by the magnetic circuit structure, a second magnetic field that changes with the audio current;

a second sounding unit, arranged coaxially with the first sounding unit, wherein the second sounding unit is mounted in the middle of a side that is of the magnetic circuit structure and that faces the annular vibrating diaphragm, a sounding frequency of the second sounding unit is greater than a sounding frequency of the first sounding unit, the second sounding unit comprises a treble vibration sound source surface, and the treble vibration sound source surface and the bass vibration sound source surface are coplanar; and an elastic suspension, configured to elastically support the voice coil and the annular vibrating diaphragm on the cone frame.

18. The electronic device according to claim 17, wherein the elastic suspension comprises an inner ring portion, a middle ring portion, and an outer ring portion that are coaxially arranged, a first cantilever connected between the inner ring portion and the middle ring portion, and a second cantilever connected between the middle ring portion and the outer ring portion, wherein the inner ring portion is arranged close to the second sounding unit, the voice coil is connected to the middle ring portion, and the outer ring portion is connected to the cone frame.

19. The electronic device according to claim 18, wherein the elastic suspension is a flexible circuit board configured to provide an audio current for the voice coil and the second sounding unit, the outer ring portion comprises an input terminal, the voice coil and the middle ring portion are electrically connected, and the second sounding unit and the inner ring portion are electrically connected.

20. The electronic device according to claim 18, wherein both the first cantilever and the second cantilever are arranged in a winding manner.

* * * * *